United States Patent [19]

Mueller

[11] 3,925,982

[45] Dec. 16, 1975

[54] FLUID-DYNAMIC SHOCK RING FOR CONTROLLED FLOW SEPARATION IN A ROCKET ENGINE EXHAUST NOZZLE

[75] Inventor: Heinz E. Mueller, Littleton, Colo.

[73] Assignee: Martin Marietta Corporation, New York, N.Y.

[22] Filed: Sept. 11, 1973

[21] Appl. No.: 396,261

[52] U.S. Cl. .................. 60/242; 60/264; 60/271; 239/265.17; 239/265.23; 239/127.3
[51] Int. Cl.² ..... F02K 1/14; F02K 1/18; F02K 9/02
[58] Field of Search ............ 60/231, 233, 242, 264, 60/271; 239/265.17, 265.23, 127.3

[56] References Cited
UNITED STATES PATENTS

| 2,971,327 | 2/1971 | Moy et al. ............... | 60/271 |
|---|---|---|---|
| 3,010,280 | 11/1961 | Hausmann ............... | 60/242 |
| 3,204,405 | 9/1965 | Warren et al. ............ | 60/231 |
| 3,279,186 | 10/1966 | Sippel et al. ............. | 60/231 |
| 3,370,794 | 2/1968 | Drewry et al. ............ | 239/265.17 |
| 3,387,787 | 6/1968 | Colonbani et al. ......... | 239/265.17 |
| 3,469,787 | 9/1969 | Marsh et al. ............. | 60/264 |

FOREIGN PATENTS OR APPLICATIONS

| 814,012 | 5/1959 | United Kingdom ........ | 239/265.17 |
|---|---|---|---|
| 895,331 | 5/1962 | United Kingdom ........ | 239/265.17 |
| 795,652 | 5/1958 | United Kingdom ........ | 60/264 |

OTHER PUBLICATIONS

Hawk, G. W. et al., "Secondary-Injection Thrust-Vector Control Systems," Aerospace Engineering, May, 1962; pp. 31–35.

Primary Examiner—C. J. Husar
Assistant Examiner—Robert E. Garrett
Attorney, Agent, or Firm—Sughrue, Rothwell, Mion, Zinn & Macpeak

[57] ABSTRACT

A rocket engine designed for high altitude operation with a large area ratio nozzle, is operated efficiently at sea level through controlled flow separation of the primary gas stream by generating a fluid-dynamic "shock ring" at a specified area ratio forcing the primary gas stream boundary layer to separate uniformly from the nozzle wall. The fluid-dynamic shock ring is generated by injecting uniformly a gas or liquid of low mass through a multitude of small holes or a circumferential slot extending the full circumference of the nozzle wall.

1 Claim, 9 Drawing Figures

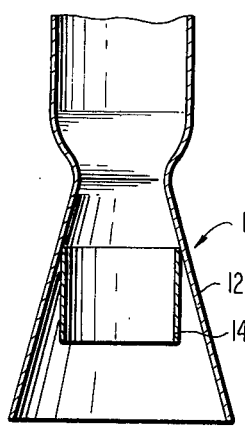
FIG. I PRIOR ART
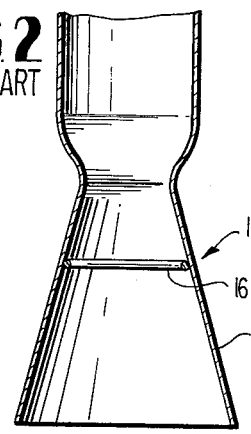
FIG. 2 PRIOR ART
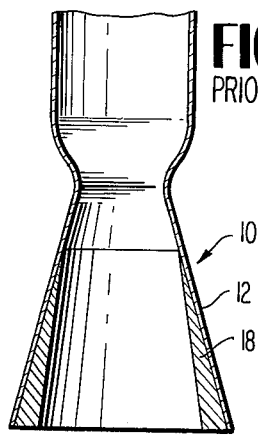
FIG. 3 PRIOR ART
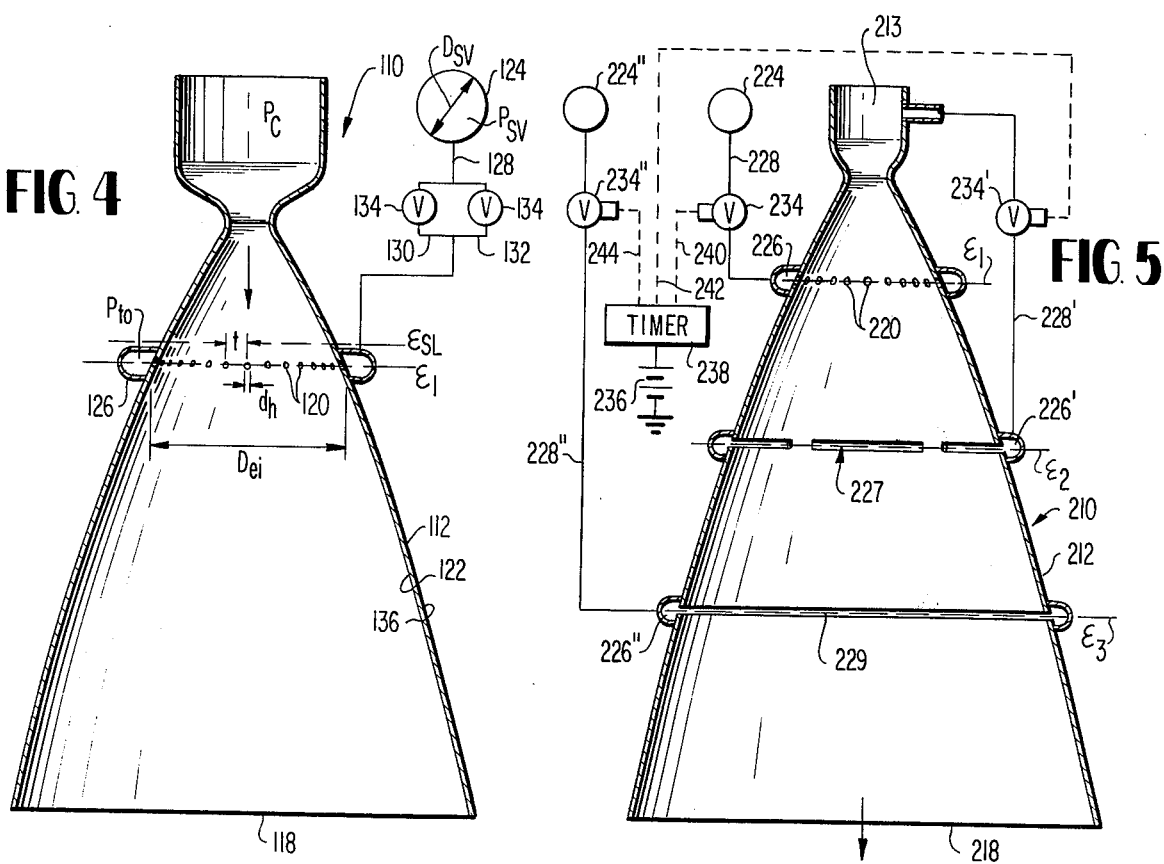
FIG. 4
FIG. 5
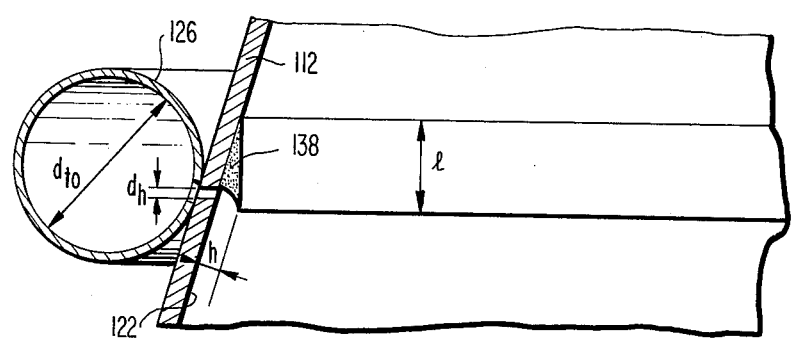
FIG. 6

FLUID-DYNAMIC SHOCK RING FOR CONTROLLED FLOW SEPARATION IN A ROCKET ENGINE EXHAUST NOZZLE

BACKGROUND OF THE INVENTION

1. Field of the Invention

This invention relates to high altitude operation rocket engines which also have to operate at sea level or low altitudes, and in particular, to large area ratio rocket nozzles thereof.

2. Description of the Prior Art

The primary gas stream or gas flow in a rocket engine exhaust nozzle is overexpanded when the ambient pressure, $P_a$ is higher than the nozzle exit pressure, $P_e$. If the pressure ratio $P_e/P_a$ is lower than a specific value, that is, critical, the gas stream detaches from the nozzle wall, that is, flow separation occurs at the boundary layer. The critical pressure ratio depends upon the gas properties in the nozzle during the expansion process and, in particular, on the nozzle contour. Nozzles contoured for optimum performance experience retarded flow separation compared to conical nozzles due to the exit gas flow which is nearly parallel to the flow axis. Typical values for conical and contoured nozzles of a rocket motor operating on an $O_2 + H_2$ propellant combination are:

|  | Conical Nozzle 15° Half Angle | Contoured Nozzle for Optimum Performance |
|---|---|---|
| Pressure Ratio for Separation, $\frac{P_e}{P_a}$ | 0.195 | 0.14 |
| Chamber Pressue, $P_c$, psia | 3000 | 3000 |
| Expansion Ratio for sea level, $P_c/P_a$ | 204 | 204 |
| Pressure Ratio for Separation, $\frac{P_c}{P_e} = \frac{P_c/P_a}{(P_e/P_a) \text{ crit.}}$ | 1050 | 1460 |
| Exit Pressure for Separation at S.L., $P_{e(s)}$ | 2.86 | 2.06 |
| Area Ratio for Separation at S.L., $\epsilon(s) = \frac{A_e}{A_t}$ | 75 | 95 |

At nozzles contoured for practically parallel gas stream exit, that is, high performance nozzles, the separation plane is generally unstable and moves back and forth with time. This jet oscillation may create dynamic problems. Conical nozzles on the other hand exhibit a more stable separation plane.

The more a nozzle is overexpanded, the higher is the performance loss at sea level due to the mismatch of the exit and ambient pressure. Therefore, flow separation, if it can be accomplished in a controlled manner, is desirable to stabilize the separation plane and to obtain the benefit of performance increase at sea level. This performance increase can be considerable with large area ratios as is shown below in a typical example:

Assumed: $O_2 + H_2$: $P_c = 3000$ psia: $\epsilon = 90$

Forced flow separation permits the rocket engine to also operate under throttled thrust conditions at sea level and the lower altitudes.

Various arrangements have been proposed and some have been tested to match large area ratio rocket engine nozzles to sea level conditions as identified in FIGS. 1, 2 and 3 of the drawings. In FIG. 1, a rocket engine 10 includes a nozzle 12, provided internally with a cylindrical section 14 extending axially and rearwardly toward the expanded exit to effect physically, flow separation at a preselected area ratio capable of achieving said separation at a given altitude. In FIG. 2, the nozzle 12 of rocket engine 10' is provided with a wire ring 16 on the inner wall of the nozzle which extends the full circumference of the nozzle at essentially the same axial position corresponding to the upstream end of cylinder 12 of the arrangement of FIG. 1. In each case, the presence of the annular member achieves controlled flow separation and an increase in sea level performance.

At a certain altitude, the inserts in the form of cylinder 14 and ring 16 blow out, resulting in frequent cases in damaging of the exhaust nozzles 10,10'. As a third arrangement, FIG. 3 illustrates the insertion of a hollow conical ablative insert 18 which during rocket engine use gradually erodes and thus disappears at a certain predetermined altitude. However, the arrangement of FIG. 3 is deficient due to the uneven erosion of the ablative material.

SUMMARY OF THE INVENTION

The present invention is directed to an arrangement for injection of a fluid in either gaseous or liquid form through a multitude of small holes in a circumferential array within the nozzle wall and radially inwards of the nozzle wall to create a fluid-dynamic "shock ring" at a specified area ratio for the nozzle and to thereby force the boundary layer to separate uniformly from the nozzle wall. The duration of the secondary fluid injection is determined by flight performance calculations and limited to a small injection mass compared to that of the primary gas stream. Preferably, a fluid distribution manifold surrounds the outside of the nozzle wall

|  | Specific Impulse, Isp | Thrust F. |
|---|---|---|
| Vacuum Condition | 457 sec. | 470,000 lb. |
| No Separation at S. L. | 352 sec. | 362,000 lb. |
| Forced Separation at S. L. at $\epsilon$=21:1, which is about the ideal area ratio at S. L. | 405 sec. | 416,000 lb. | and directs the secondary fluid to all the circumferentially spaced holes or a continuous slot ring simultaneously for uniform injection into the nozzle interior and the primary gas stream. Secondary fluid is preferably stored in a vessel under pressure and supplied to the manifold through one or more explosively operated valves blow down system. Two or more fluid injection systems at different area ratios may be employed with controlled fluid injection by operating the systems in succession as the rocket engine journeys from sea level to altitude. Besides the blow down fluid system, other fluid feed systems may be used. For example, a feed system where the combustion chamber gas is utilized as the separation fluid.

BRIEF DESCRIPTION OF THE DRAWINGS

FIG. 1 is a sectional schematic view of a large area ratio rocket engine nozzle employing one form of prior art flow separation arrangement.

FIG. 2 is a sectional schematic view of a similar rocket nozzle showing an alternate prior art primary gas stream separation means.

FIG. 3 is a sectional schematic view of yet another large area ratio rocket engine nozzle employing an alternate prior art arrangement for effecting primary gas stream separation from the nozzle wall.

FIG. 4 is a sectional schematic view of a large area ratio rocket engine nozzle employing the primary gas stream separation arrangement of the present invention, in one form.

FIG. 5 is a sectional schematic view of a large area ratio rocket nozzle employing an alternate form of the flow separation arrangement of the present invention.

FIG. 6 is an enlarged schematic sectional view of a portion of a large area ratio rocket nozzle illustrating in greater detail the flow separation arrangement of the present invention.

DESCRIPTION OF THE PREFERRED EMBODIMENTS

Figure 7:
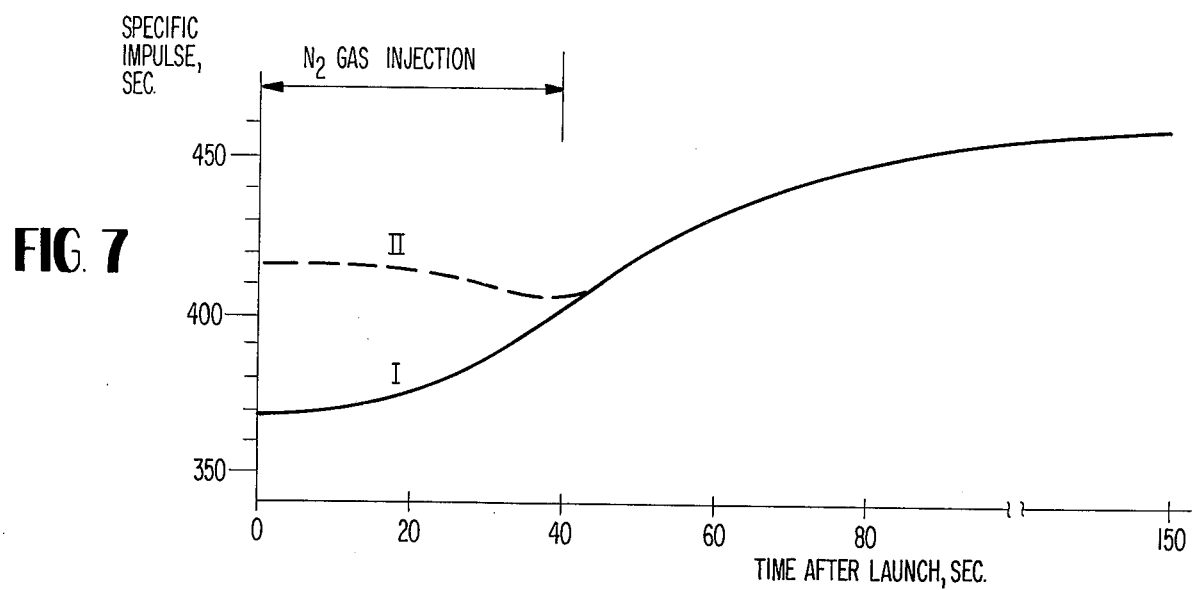
FIG. 7 is a plot of specific impulse against flight time after launch for a large area ratio rocket nozzle with and without the flow separation arrangement of the present invention.

Turning to FIG. 4, one embodiment of the present invention is illustrated schematically as being applied to a rocket engine indentified generally at 110 having as an element thereof, a large area ratio, contoured nozzle 112 wherein the primary gas stream exits from the engine through the diverging nozzle 112 in the direction of the arrow from exit end 118 of the same. At the nozzle area ratio $\epsilon_1$ where the flow separation is to take place, a fluid which may be gas or liquid but is preferably a gas, is injected radially inward of the nozzle wall through a plurality of holes 120, or a ring slot, which are preferably evenly spaced over the circumference of the nozzle 112. Alternatively, the nozzle may be simply conical in cross section, and a continuous ring slot extending the full circumference or a large extent of the same without interruption may be employed. The injected secondary fluid, in interaction with the primary nozzle flow, generates a fluid "shock ring" which forces the primary gas flow to separate uniformly from the inner wall 122 of the nozzle in a controlled fashion. In this respect, the fluid which preferably is a gas, such as $N_2$, is stored under pressure within a fluid storage vessel 124 and is supplied to the annular fluid distribution manifold 126 through line 128 which divides intermediate of the vessel 124 and manifold 126 into parallel lines 130 and 132, each of which carries an explosively operated valve 134, insuring operation of the system due to the redundancy resulting from the use of two valves 134. The fluid distribution manifold 126 in the schematic form comprises an annulus which is sealably attached at its edges to the outer wall surface 136 of the nozzle 112 overlying the holes 120, such that the gas (not shown), which is stored within the storage vessel 124 passes rapidly through line 128 upon firing of the explosive associated with at least one of valves 134 for fluid injection in uniform fashion throughout the complete circumference of the inner wall surface 122 of the nozzle at a plane designated by area ratio $\epsilon_1$. The duration of the fluid injection depends upon the flight trajectory, that is, the relationship of exit to ambient pressure with time. Since the required amount of fluid to be injected per second is small, and the duration of the fluid injection relatively short, a simple blow down system operated by explosively operated valves is preferably employed as the fluid feed system to the interior of nozzle 112.

The advantages of the flow separation system of the present invention become readily apparent. Under the system illustrated schematically in FIG. 4, the flow separation is positively controlled and the system components are simple, light weight and are completely re-usable. There is no disposable or erodable part which could damage the exhaust nozzle as occurs in all of the three arrangements of FIGS. 1–3 inclusive. The system effects improvement of the engine at sea level and low altitudes and allows thrust reduction, that is, motor thrust, through chamber pressure reduction at sea level or low altitude. Further, the system which effects flow separation throughout the circumference of the nozzle minimizes side forces during engine starting as a result of uncontrolled, and localized, flow separation. The dynamic problems resulting from jet oscillations of highly overexpanded gas flow in a nozzle are avoided, and this is particularly important where multiple engines are employed, since oscillations in the engines in a multi-engine array may affect each other amd result in a severe pumping effect. Further, depending upon the exhaust nozzle contour, controlled jet separation in fact increases engine performance at or near sea level.

In a typical example for the fluid-dynamic flow separation system of FIG. 4 and FIG. 6 for a thrust chamber operating on $O_2 + H_2$ at a chamber pressure $P_c = 3000$ psia with a nozzle area ratio of $\epsilon = 90:1$, flow separation is achieved for the first 40 seconds of flight ascent at nozzle area ratio $\epsilon = 25$. At $\epsilon = 25$, manifold torus 126 with a tube diameter $d_{to}$ of 2.5 inches recieves a secondary injection fluid in the form of nitrogen which, in turn, is injected through 267 holes of 0.04 inches, $dh$ in diameter each, with spacing between holes $t$ being 0.5 inches. The blow down feed system permits the nitrogen to be stored in a sphere 124, 1 foot in diameter $D_{sv}$ at a pressure $P_{sv}$ of 2000 psia. Valves 134 comprise 2½ inch diameter valves operated explosively and in this example, the hardware weight for the system is approximately 39 pounds and the required nitrogen stored within vessel 124 is 6 pounds, making the total 45 pounds. The shock ring in the nozzle is formed by 267 evenly spaced holes 120 in a complete circumferential array about the nozzle 112. Nitrogen flow at each hole protrudes into the exhaust stream of the nozzle, $h$ 0.0785 inches, with a distance $l$ from the hole centerline to the vortex of the shock cone 138 of about 0.204 to 0.25 inch. Performance increase during the first 40 seconds of ascent over a full flowing nozzle of $\epsilon = 90$, amounts to about 50 seconds in specific impulse, with assumptions as follows:

| | |
|---|---|
| Propellant: | $O_2 + H_2$ |
| Chamber Pr.: | $P_c = 3000$ psia |
| Nozzle Area R.: | $\epsilon = 90$ |
| Ideal S. L. $\epsilon$: | $\epsilon$ S. L. $= 21$ |
| $\epsilon$ for $N_2$ - Inject: | $\epsilon_i = 25$ |
| Mach Number at $\epsilon_i$: | $M_0 = 4$ |
| Nozzle dia at $\epsilon_i$: | Dei $= 42.5''$ |
| Inject hole dia.: | $d_h = 0.04''$ |
| Spacing of holes: | $t = 0.5''$ |
| Number of holes: | $N = \dfrac{\pi \times 42.5}{0.5} = 267$ |
| Injectant: | $N_2$ - Gas |
| $N_2$ - pressure in torus: | $P_{to} = 1000$ psia |
| $N_2$ - pressure in storage vessel: | $P_{sv} = 2000$ psia |
| $N_2$ - Temperature: | $T_N = 530°R$. |

Typical flight schedule for the ascent of the vehicle may be then calculated as follows:

| Time, t sec | Altitude, A ft | Ambient Pressure, $P_a$, psia | Ratio of $P_c$ to $P_e$ at A | $\epsilon$ Ideal at A | |
|---|---|---|---|---|---|
| 0 | O, S.L. | 14.7 | 204 | 21 | |
| 10 | 725 | 14.4 | 208 | 21.4 | 40 sec |
| 20 | 3089 | 13.2 | 227 | 22.8 | selected |
| 30 | 7342 | 11.35 | 264 | 25 | for $N_2$ |
| 40 | 13607 | 9.0 | 334 | 29.5 | injection |
| 50 | 21895 | 6.5 | 461 | 37.5 | |
| 60 | 31930 | 4.26 | 705 | 51.5 | |
| 70 | 43298 | 2.51 | 1195 | 75 | |
| 75 | 48000 | 1.9 | 1570 | 90 | |

Figure 8:
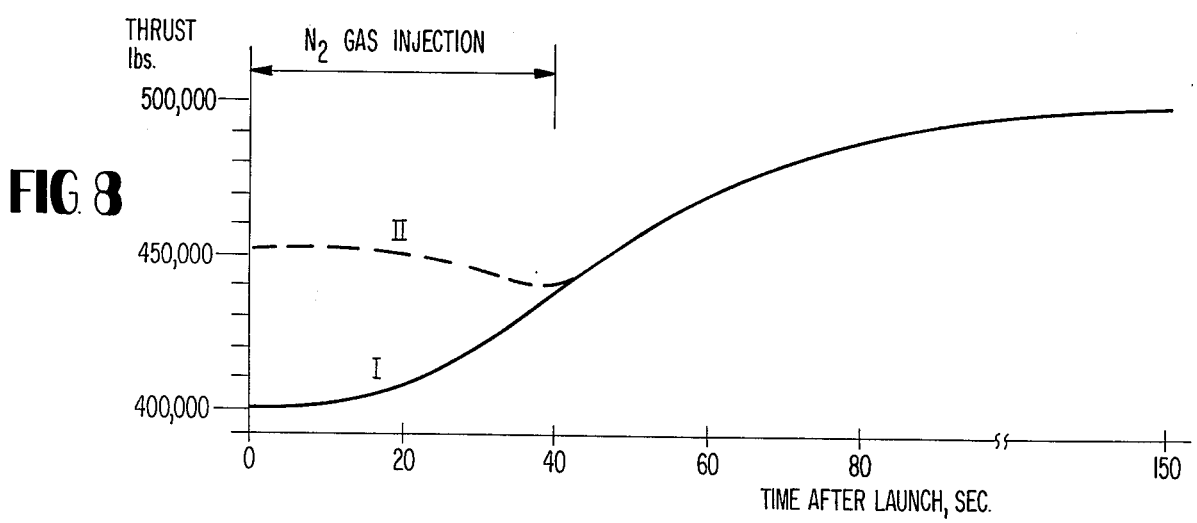
FIG. 8 is a plot of thrust against flight time after launch for a large area ratio rocket nozzle with and without the flow separation arrangement of the present invention.
Figure 9:
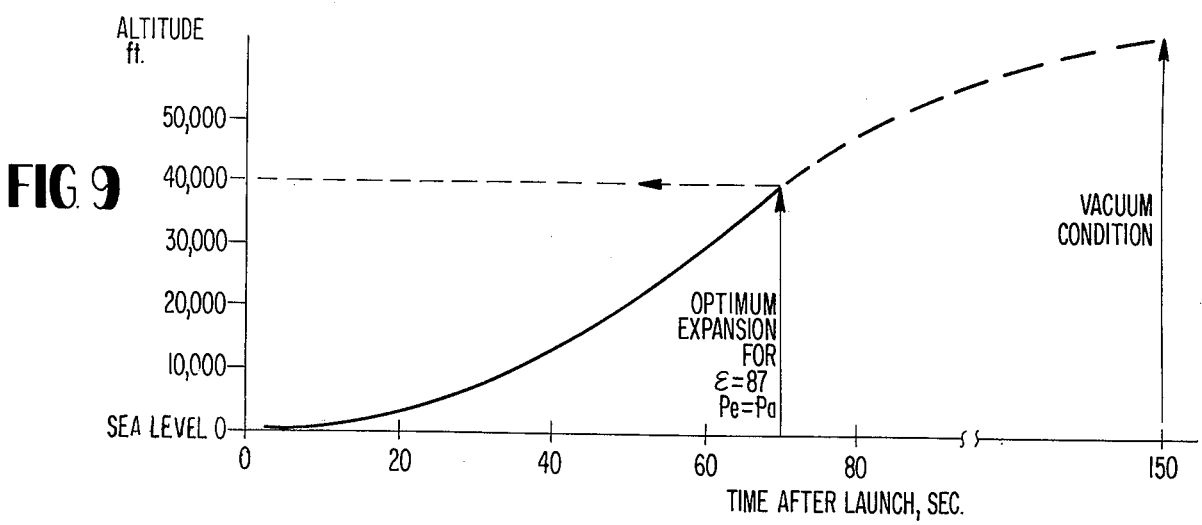
FIG. 9 is a plot of altitude against flight time after launch for a typical large area ratio rocket nozzle employing a large area ratio nozzle.

Reference to FIGS. 7, 8 and 9 illustrate graphically the performance characteristic for a typical rocket engine having a large area ratio nozzle particularly designed for altitude operation in terms of curves for two generally identical nozzles. In each illustration, the curve I results from a plot of parameters of a nozzle flow at sea level under overexpanded conditions, but in which case no boundary layer separation occurs, and the performance curve identified from the same nozzle operating under forced separation at $\epsilon = 25$ through the arrangement of the present invention. With respect to the plots, the engine is assumed to operate with a pressure $P_c = 3140$ psia and a large area ratio $\epsilon = 87$.

Turning to FIG. 7, it is noted that shortly after launch with the nozzle operating under overexpanded conditions relatively close to sea level and with no separation, the specific impulse is roughly 370 sec. at the instant of launch and gradually increases to a miximum of approximately 450 sec. at altitude under vacuum conditions. In contrast, reference to curve II which merges with the curve I at the termination of the nitrogen gas injection and cessation of the fluid-dynamic shock ring of the present invention, at time of launch, the specific impulse is on the order of 415 and remains generally constant over the initial first 40 sec. of launch. In terms of thrust, reference to FIG. 8 illustrates the fact that approximately a 12½% increase in thrust is available at sea level through the use of fluid-dynamic "shock ring" forced flow separation arrangement of the present invention in a rocket engine employing the large area ratio nozzle of the prior example. The modified engine maintains the thrust in the neighborhood of 450,000 pounds during the complete injection period for the nitrogen gas with slight drop as the vehicle reaches an altitude of between 10,000 and 20,000 feet. Reference to FIG. 9, illustrates the flight characteristics of a vehicle so equipped in terms of the plot of altitude against time after launch with an indication that optimum expansion for a nozzle having a large area ratio in terms of $\epsilon = 87$ occurs at approximately 40,000 feet, at which point the exit pressure $P_e$ is equal to the atmospheric pressure $P_a$. From the above curves, the improvement in engine performance at low altitude and for rocket engines having large area ratio nozzle is remarkably evident.

The concept of the present invention is applicable to systems in which the fluid-dynamic shock ring may be produced in sequence at various positions along the nozzle wall to effect uniform separation of the boundary layer of the primary gas stream consequent to altitude change. FIG. 5 illustrates schematically a system in which the fluid-dynamic shock ring occurs in sequence at nozzle area ratios related to the altitude of the engine. For instance, in the system of FIG. 5, a rocket engine 210 having a large area ratio contoured nozzle 212 permits the primary gas stream to exit from thrust chamber 213 through the diverging nozzle in the direction of the arrow from the exit end 218 of the same. At nozzle area ratio $\epsilon_1$, where initial flow separation is to take place, a fluid such as nitrogen gas under pressure is stored within a fluid storage vessel 224 and delivered via line 228 and explosive operated valve 234 to the annular fluid distribution manifold 226 for uniform injection through a plurality of circumferentially spaced holes 220 extending completely about the circumference of the nozzle 212, thus reproducing a first fluid-dynamic shock ring similar to that illustrated in FIG. 6. As the rocket rises, termination of secondary flow injection occurs with respect to the fluid stored within storage vessel 224, and in controlled sequencee fluid is injected into the interior of the nozzle 212 through a separated narrow slot 227 defined by manifold 226'. Operation is conntrolled by explosive operated valve 234' within line 228' leading from thrust chamber 213 to manifold 226'. The pressure difference between the primary gas stream in the thrust chamber 213 and the slot 227 is sufficient to inject a portion of this stream as the secondary fluid for boundary layer flow separation purposes. Thus, after termination of the first fluid-dynamic shock ring in a plane defined by area ratio $\epsilon_1$, a second fluid-dynamic shock ring occurs downstream within the nozzle 212 at a larger area ratio $\epsilon_2$ to insure flow separation at this point until the rocket ascends to a further predetermined altitude. At that time, automatically, under control of timer 238, the injection of secondary fluid is terminated through the sequential slot 227 and a third fluid-dynamic shock ring is initiated at the plane defined by a continuous slot 229 at area ratio $\epsilon_3$. The timer 238 is of the type shown in U.S. Pat. No. 3,142,959 to E. L. Klein entitled "Range Control of Self Propelled Missile". In this case, fluid stored in vessel 224'' exits through explosive operated valve 234'' and the line 228'' to annular manifold 226'' surrounding the slot 229 on the outside wall of the nozzle 212, whereupon final boundary layer flow separation of the main fluid stream occurs in the vicinity of this slot to provide the desired and favorable characteristics to the engine during the final rise of the large area ratio nozzle rocket to an altitude in which the primary gas stream is no longer overexpanded and wherein the exit pressure $P_e$ is equal to the atmospheric pressure $P_a$, at which time the injection of secondary fluid ceases through slot 229.

Valves 234, 234' and 239' include an electrically ignitable explosive, each being ignited in turn from an electrical source such as battery 236 via timer 238 through lines 240, 242, 244, respectively. Valves 234, 234' and 234'' may both control the initiation and termination of secondary fluid to their associated manifolds 226, 226' and 226'', or the system may store a given amount of secondary injection fluid such as nitrogen gas in amounts such that the available supply and its pressure within the individual storage vessels is correlated to the altitude position of the rocket engine, thus cessation of injection occurs automatically due to the lack of available gas at given altitude.

Altitude sensing means or a timer correlated thereto effects sequential explosion of valves 234, 234' and 234''. Thus, injection through slot 227 ceases at the point where the rocket engine reaches an altitude in which the creation of the fluid-dynamic shock ring should occur at the large area ratio $\epsilon_3$ in the plane of slot 229'', where such injection flow is initiated, while injection ceases due to lack of secondary fluid supply at manifold 226' and area ratio $\epsilon_2$. Thus, notably controlled jet separation occurs with a very minimum of gas injection through a multitude of small orifices or holes or slots in the flow rates amounting to one-tenth of 1 per cent of the primary gas flow with the secondary gas temperature being at room temperature. It is understood that the performance of all types of highly overexpanded nozzles can be improved by the arrangement of the present invention.

What is claimed is:

1. In a rocket engine main nozzle having throat and divergent sections for the expansion and discharge of a main thrust producing gas stream, said nozzle section having a large area ratio; means for injecting at launch and thereafter a low mass secondary fluid radially interiorly of the nozzle and about the full circumference thereof to form at least one fluid-dynamic shock ring to force the boundary layer of said main gas stream to separate uniformly from the nozzle wall, the improvement comprising:

said means for injecting a secondary fluid interiorly of said nozzle wall being plural in number, axially spaced at positions corresponding to specified area ratio, an annular manifold surrounding each injecting means on the exterior surface of the nozzle wall being sealed at both side edges to said wall, a source of fluid provided for each injection means, means fluid coupling said source respectively to each manifold, selectively operable valve means provided within said fluid coupling means, and timer operated means for controlling said selectively operable valve means to effect secondary fluid flow sequentially within said axially spaced secondary fluid injecting means in order from said throat at times corresponding to specific rocket altitude such that flow initiated in the immediately succeeding secondary fluid injecting means after terminating in the immediately proceeding secondary fluid injecting means, such that the boundary layer separates uniformly from the nozzle wall at succeedingly downstream positions corresponding to said specified area ratios at corresponding rocket altitude under rocket engine launch conditions, and wherein, each secondary fluid injecting means is provided with a separate supply of secondary fluid of a mass such that the flow of secondary fluid to a given secondary fluid injecting means terminates automatically in response to the rocket engine reaching the altitude corresponding to the flight point wherein the next secondary fluid injecting means in said sequence is to receive secondary fluid under control of said timer operated means such that valve opening is initiated by said timer operated means during secondary fluid injection in said given sequence to provide boundary layer separation at specified area ratios corresponding generally to rocket altitude.

* * * * *